(12) United States Patent
Helm et al.

(10) Patent No.: US 6,598,866 B2
(45) Date of Patent: Jul. 29, 2003

(54) WORKPIECE SUPPORT

(75) Inventors: Stephen P. Helm, Preston (GB); Brian A. Hoggatt, Nelson (GB); Brian Moore, Preston (GB)

(73) Assignee: BAE Systems PLC, Farnborough (GB)

( * ) Notice: Subject to any disclaimer, the term of this patent is extended or adjusted under 35 U.S.C. 154(b) by 24 days.

(21) Appl. No.: 09/741,911

(22) Filed: Dec. 22, 2000

(65) Prior Publication Data

US 2001/0020762 A1 Sep. 13, 2001

Related U.S. Application Data

(63) Continuation of application No. PCT/GB00/04107, filed on Oct. 25, 2000.

(30) Foreign Application Priority Data

Oct. 29, 1999 (GB) .............................................. 9925610

(51) Int. Cl.[7] .............................................. B25B 11/00
(52) U.S. Cl. .......................... 269/21; 269/266; 269/43; 29/897.2; 29/526.06
(58) Field of Search ........................ 269/21, 266, 296, 269/297, 298, 299, 300, 301, 287, 43; 29/897.2, 525.06, 429, 722, 407.05; 72/60

(56) References Cited

U.S. PATENT DOCUMENTS

| | | | |
|---|---|---|---|
| 4,381,104 A | * 4/1983 | Nelsen | 269/43 |
| 4,527,783 A | * 7/1985 | Collora | 269/21 |
| 4,894,903 A | 1/1990 | Woods | |
| 4,995,146 A | * 2/1991 | Woods | 29/281.3 |
| 5,144,825 A | * 9/1992 | Burg | 72/60 |
| 5,249,785 A | 10/1993 | Nelson et al. | |
| 5,482,409 A | * 1/1996 | Dunning | 408/1 R |
| 5,615,483 A | * 4/1997 | Micale | 29/897.2 |
| 6,029,352 A | * 2/2000 | Nelson | 29/897.2 |

FOREIGN PATENT DOCUMENTS

| | | |
|---|---|---|
| EP | 0 179 957 | 5/1986 |
| GB | 1 315 692 | 5/1973 |
| GB | 2 136 727 | 9/1984 |
| GB | 2 214 454 | 9/1989 |

* cited by examiner

Primary Examiner—Joseph J. Hail, III
Assistant Examiner—Daniel Shanley
(74) Attorney, Agent, or Firm—Nixon & Vanderhye P.C.

(57) ABSTRACT

A modular workpiece support reconfigurable to support a number of similar, but different profiled workpieces (such as the leading edge skin sections of an aircraft wing) comprises a base 32 defining a number of stations along the component. Each station comprises a clamp block 34, and a frame element 38 of predetermined profile may be clamped in the clamp block in either of two different orientations (for hand and opposite). Each frame element includes a number of suction cups 40, the suction being controlled by a valve 42. The workpiece support may be rapidly reconfigured for a symmetric component simply by unclamping and rotating the frame element through 180°. The workpiece support may also be reconfigured for different profiles by selecting the appropriate frame elements from a library thereof.

24 Claims, 3 Drawing Sheets

WORKPIECE SUPPORT

This is a continuation of PCT application No. PCT/GB00/04107 filed Oct. 25, 2000.

BACKGROUND OF THE INVENTION

1. Field of the Invention

This invention relates to workpiece supports for supporting a workpiece and, in particular, but not exclusively, to a workpiece support for supporting a workpiece during a machining or routing operation.

2. Discussion of Prior Art

There are many applications where it is required to support one of a number of workpieces of different profiles during a machining or routing operation. For example, the leading edge skin of a typical commercial aircraft wing is made up of about a dozen sections of the same general shape but of different detailed profile. In an existing proposal, a sheet element is stretch-formed over a stretch-form of the required three-dimensional profile. After this initial forming the component is routed out of the stretch-formed skin. The stretch-forming and routing operations include six different stages as set out in FIGS. 1(a) to (f) of the accompanying drawings. Initially the margins 12 of the skin 10 are clamped in the jaws of a stretch form machine and then stretch-formed around a profile to -give the required shape. At this stage, although the overall profile of the skin is formed, the component itself still needs to be cut out of the stretch-formed skin using e.g. a CNC routing machine, and it is essential that the skin be accurately located prior to the routing operation. Thus in stage 2 the stretch-formed surplus is removed and pilot holes 14 are drilled in the opposite edges of the workpiece 10 which are enlarged to form location or component clamping holes. In stages 3 and 4 the trimmed workpiece 10 is applied to a routing fixture 16 which has a series of manually operated toggle clamps 18 which engage in the component clamping holes 14 and pull the workpiece accurately into alignment on the routing fixture 16. The profile is then routed leaving tags 20. In stage 5 the workpiece 10 is removed from the routing fixture 16, and in stage 6 the component is snipped out of the workpiece 10, detagged and deburred.

There are several disadvantages with this process. It requires a separate dedicated fixture and manually operated clamps for each of the different profile sections of the aircraft wing. In a typical example there may be thirteen different profiles for each wing, making a total of twenty-six hand and opposite routing fixtures. This constitutes a considerable capital outlay for each of the fixtures and a considerable storage requirement.

After stretch-forming, two tooling holes are drilled, the clamping margin 12 or "flashing" has to be removed before final machining. In order to assist in clamping and accurate location of the workpiece, several component clamping holes need to be drilled in each of the opposite edges of the workpiece. Because the workpiece 10 is held on the routing fixture 16 by a non-selective attachment (that is the toggle clamps 18) it is necessary to leave tags around the periphery of the component to keep it in the correct orientation and maintain clamping forces on the component. The tags then have to be removed by hand machining which adds to the process steps.

EP-A-0179957 discloses an arrangement for holding contoured workpieces which comprises a lattice arrangement of spring strips each having a series of suction cups standing proud of the strip for holding the workpiece by suction. In this arrangement the workpiece is supported at a distance from the lattice strips which means that it is not supported apart from at the suction cups. This support only at spaced point regions may provide inadequate support during machining, leading to vibration, and machining inaccuracies. Also, the lattice structure is essentially permanent, there being no apparent provision for readily removing individual members thereof. Thus changes in profile are achieved by flexing the lattice to a different configuration by rams at spaced points. This means that the configuration may only be an approximation to the required shape.

SUMMARY OF THE INVENTION

Accordingly, in one aspect, this invention provides a workpiece support for supporting a workpiece of a given profile, and being reconfigurable in use to support workpieces of a different profile, said workpiece support including:

a base means having a plurality of anchorage means at spaced intervals;

a plurality of station frame elements for being removably secured to said anchorage means to provide in use support for a given workpiece over an extended area at spaced stations, and attachment means associated with each of said frame elements and being operable in use locally to secure the workpiece to said frame element.

In this arrangement, the station frame elements provide support over an extended area, typically a line or narrow strip contact of continuous or interrupted form, extending across a portion of the workpiece. This provides a secure location for the workpiece. In addition, the frame elements are removable. By making up the workpiece support from a series of spaced removable station frame elements, rather than being in the form of a single integral routing fixture, it is possible to provide support for a wide range of different profiled workpieces by having a library of differently profiled station frame elements from which the required station frame elements for a particular workpiece profile may be selected and anchored to the base. In addition, where the workpieces are handed, or symmetrical, for example the leading edge skin sections of an aircraft, the left and right hand body panels of a car etc., the workpiece support may be reconfigured between the symmetrical pairs simply by releasing each of the frame elements in turn, rotating them through 180° and re-anchoring them to the base means. Furthermore, the library of frame elements may be stowed is compactly in a stacked or side-by-side arrangement, thereby considerably reducing the storage requirements compared to the existing fixtures. This leads to a consequent reduction in terms of set up time and lead time, and a reduction in tooling budget.

Although the attachment means for securing the workpiece to the workpiece support may take many forms, it is preferred for it to comprise suction means. The suction means advantageously comprises a plurality of suction cups of resiliently deformable material spaced on the frame elements to face the underside of the workpiece in use and to draw the workpiece down onto the frame element.

An important advantage of the use of suction cups, or other localised suction application, is that the suction may be both localised and independent of the suction at other positions. Thus, given suitable spacing of the frame elements and the suction cups it is possible to rout around the entire periphery of a component, without having to leave tags as previously. In other words, since the component and the scrap are individually and independently clamped by the suction cups there will be little, if any, displacement of the component relative to the scrap when the periphery is routed. This provides an important advantage because it means that the manual snipping and de-tagging operations are no longer necessary.

Where the workpiece has a convex or concave profile, the attachment means are preferably disposed one at or adjacent the peak or trough of the profile and one or more on the flanks of the frame elements to either side thereof.

Preferably, at least one of the frame elements includes location means for co-operation in use with corresponding location means on the workpiece to locate the workpiece relative to said workpiece support. Conveniently, the two outermost frame elements may each include such location means. The location means may typically comprise a pin or spigot on the frame elements which engages a location hole on the workpiece.

Using the frame element to provide the location means which locate the workpiece obviates requirements in previous proposals to trim the flashing following stretch-forming, and to drill a series of clamping holes in opposite sides of the stretch-formed item. Again this reduces the number of process operations and thus cost.

Preferably, said anchorage means includes clamp means for releasably clamping said frame elements to the base. The clamp means preferably allow the frame elements to be clamped thereto in either of two orientations spaced by 180°. The clamp means may be hydraulically operated.

Preferably, said anchorage means are spaced at equal intervals.

The invention also extends to a machine tool including a workpiece support as set out above.

In another aspect, this invention provides a method of providing support for one of a number of workpieces of different profiles, which includes:

providing a base means having a plurality of anchorage means at spaced stations;

providing a plurality of frame elements corresponding to the profiles of said workpieces at said spaced locations;

selecting for a given workpiece the frame elements corresponding to the profiles at said stations;

removably securing said frame elements to said base means to define a reconfigurable workpiece support; and removably securing said workpiece to said reconfigurable workpiece support.

Where at least two of said workpieces have profiles which form a generally symmetrical pair, the same frame elements are preferably used for each of the pair, with the order and/or orientation of the frame elements being reversed.

Whilst the invention has been described above, it extends to any inventive combination of the features set out above or in the following description.

BRIEF DESCRIPTION OF THE DRAWINGS

The invention will now be described by way of example only, reference being made to the accompanying drawings in which.

DETAILED DISCUSSION OF EMBODIMENTS

Figure 1:
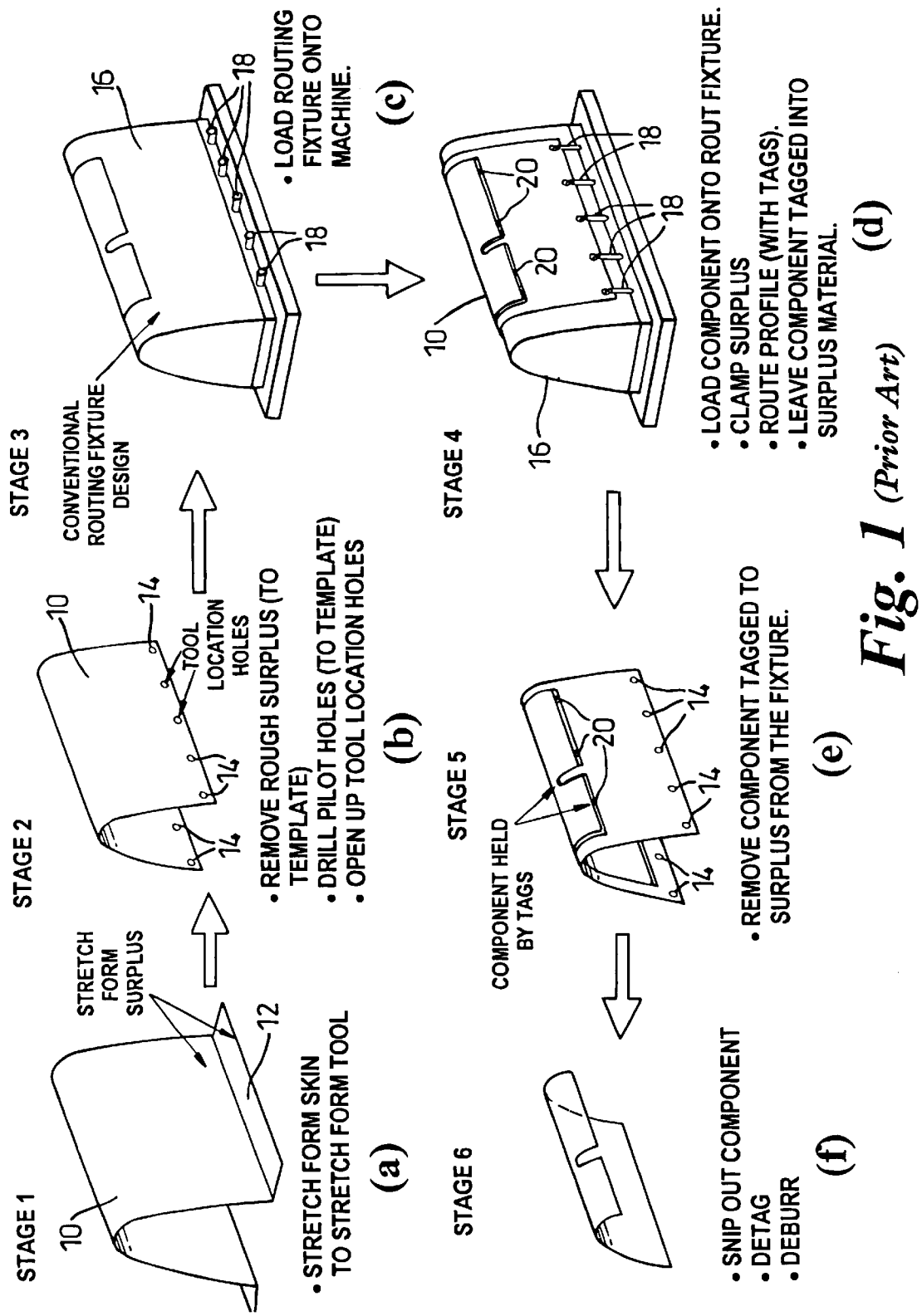
FIGS. 1(a) to (f) illustrate schematically the stages involved in the production of a leading edge skin component, following stretch-forming according to an existing proposal.
Figure 2:
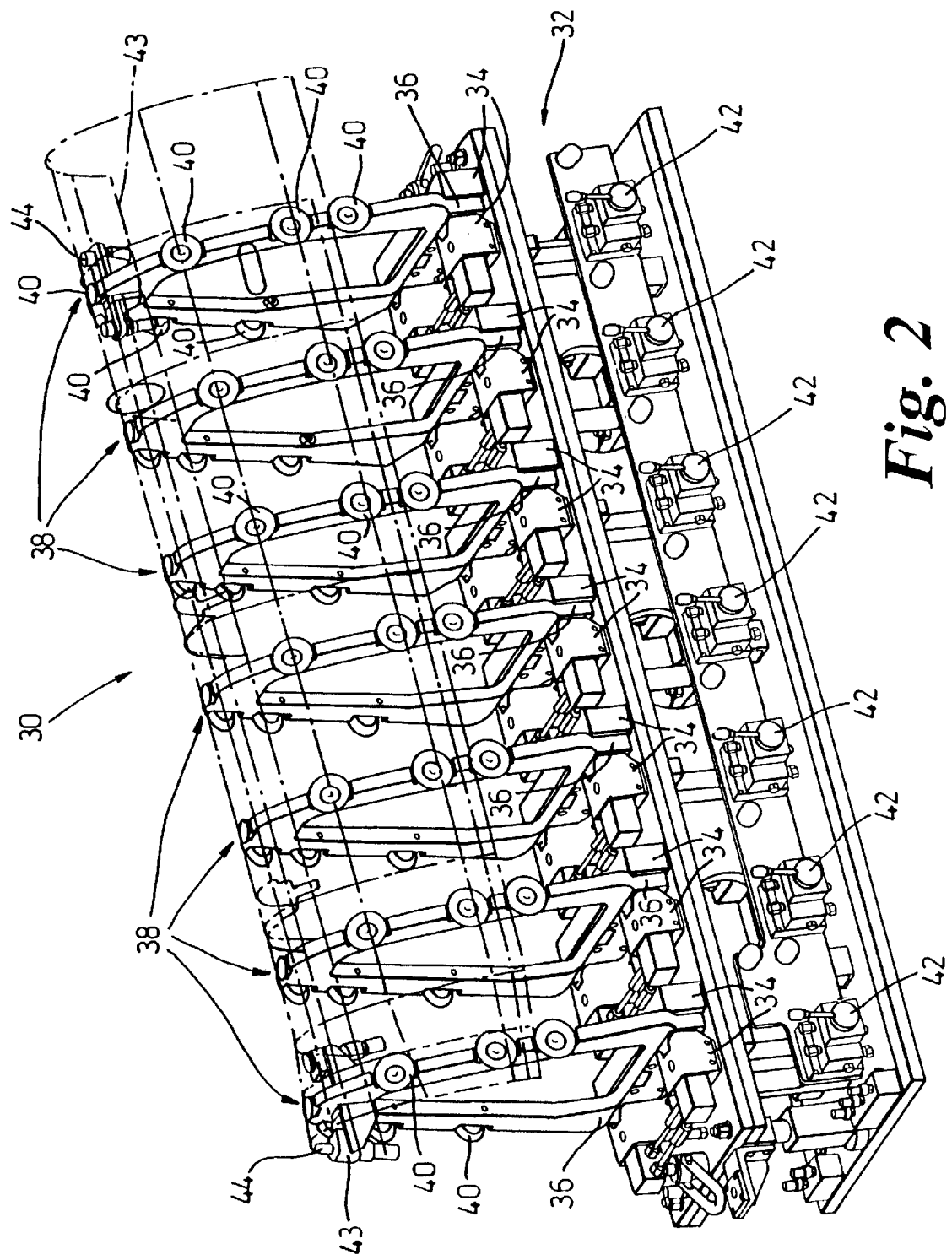
FIG. 2 is a schematic perspective view showing a workpiece support in accordance with this invention.

Referring to FIG. 2, the workpiece support 30 comprises a base 32 defining a number of stations, in this example seven. Each station comprises a hydraulically-operated clamp block 34 which is adapted to receive and clamp, the root 36 of a station frame element 38. The roots 36 are of a standard geometry which is reversible so that the frame element can be clamped in the clamp block 36 in either of two orientations. The remainder of the frame element is profiled in accordance with the profile of the workpiece to be supported. The system will include a library of different shaped frame elements for each of the workpieces to be supported, although some of the frame elements may be the same between different workpieces.

Each frame element includes, in this example, six suction cups 40; one at the apex of each frame element and three down each flank thereof. Suction is supplied to each of the cups 40 by suction tubes (not shown) which terminate in a standard connector (not shown) which connects to corresponding suction connectors on the base 32 which pass via tubes (not shown) to a suction control valve 42. The suction control valve 42 is operable to control the suction to the cup 40 at the apex independently of the cups 40 on the flanks of the frame element.

All the stations include frame elements and suction control as described. The first and last frame elements additionally include a fixture 43 which defines a registration datum for the workpiece when applied to the support. In this instance, the datum comprises a location pin 44 which locates in a hole in the stretch-formed sheet. The fixture may be a permanent part of the associated frame element or it could be removable so that it can be transferred between frame elements.

Figure 3:
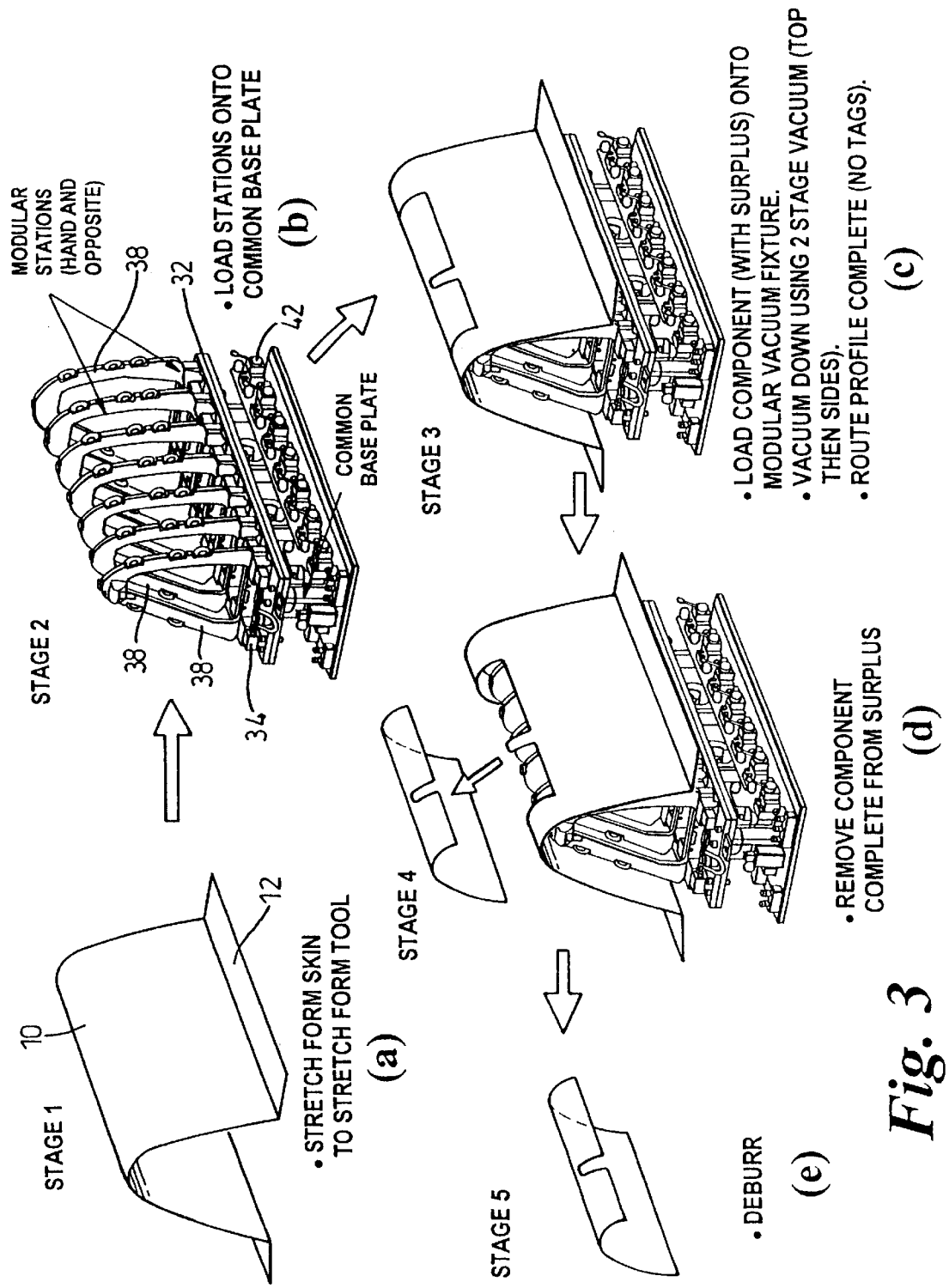
FIG. 3 shows the stages involved in the production of a leading edge skin component following stretch-forming, in accordance with this invention.

Referring now to FIG. 3, this shows the manufacturing steps following stretch-forming of a leading edge skin panel. In the first stage (FIG. 3a) the skin 10 is stretch-formed on a stretch form tool and two tooling holes are drilled at either end of the skin, leaving the clamp margins or flashing 12. In stage 2, the frame elements 38 particular to the leading edge skin section being machined are loaded onto the common base plate 32 and secured in position with the hydraulically-operated clamp blocks 34 to make up a workpiece support of the type shown in FIG. 2. The stretch-formed skin, with two datum holes in it is applied to the workpiece support and the location holes in the skin engaged with the location pins 44 on the outermost frame elements 38. Suction is then applied to each of the frame elements 38 in two stages. In the first stage, vacuum is applied to the apex suction cups 40 to pull the nose of the stretch-formed skin 10 into engagement with the frame elements 38. Thereafter vacuum is applied to the remaining suction cups 40 to draw the sides into engagement with the frame elements 38.

A router (not shown) then routs around the entire periphery of the component to be formed (without leaving tags). The suction is then released to allow the component to be removed from the surplus and then de-burred.

If at this stage it is wished to machine the corresponding profile for the corresponding section on the other wing (i.e. the mirror image section) this may be achieved simply by unclamping each of the frame elements in turn, rotating vertically about 180° and re-securing the frame elements, to provide a workpiece support of opposite hand.

What is claimed is:

1. A workpiece support for supporting a workpiece of a given profile, and being reconfigurable to support a workpiece of a different profile, said workpiece support including:

a base means having a plurality of anchorage means at spaced intervals;

a plurality of station frame elements removably secured to said plurality of anchorage means for providing support for a given workpiece over an extended area at spaced stations, and attachment means associated with each of said station frame elements for securing the workpiece to said workpiece support, wherein each of said anchorage means permits each respective station frame element to be secured to said base means in either of two different angular working orientations.

2. A workpiece support according to claim 1, wherein said attachment means comprises suction means.

3. A workpiece support means according to claim 2, wherein said suction means comprises a plurality of suction cups of resiliently deformable material.

4. A workpiece support means according to claim 1, wherein at least one frame element has a convex or concave outer profile and said attachment means are disposed one at or adjacent the peak or trough of the profile and one or more on the flanks of the profile to either side thereof.

5. A workpiece support according to claim 1, wherein at least one of said frame elements includes location means for co-operation with corresponding location means on said workpiece, to locate said workpiece relative to said workpiece support.

6. A workpiece support according to claim 5, wherein the two outermost frame elements include location means.

7. A workpiece support according to claim 5 or wherein said location means comprise a pin or spigot.

8. A workpiece support according to claim 1, wherein each anchorage means comprises clamp means for removably clamping said station frame element to said base means.

9. A workpiece support according to claim 8, wherein said clamp means comprise hydraulically operated clamp means.

10. A workpiece support according to claim 1, wherein said anchorage means are spaced at generally regular intervals.

11. A machine tool including a workpiece support for supporting a workpiece of a given profile, and being reconfigurable to support a workpiece of a different profile, said workpiece support including:

a base means having a plurality of anchorage means at spaced intervals;

a plurality of station frame elements removably secured to said anchorage means for providing support for a given workpiece over an extended area at spaced stations, and attachment means associated with each of said station frame elements for securing the workpiece to said workpiece support, wherein each of said anchorage means permits each respective station element to be secured to said base means in either of two different angular working orientations.

12. A workpiece support for supporting a workpiece of a given profile, and being reconfigurable in use to support a workpiece of a different profile, said workpiece support including:

a base having a plurality of anchorages at spaced intervals;

a plurality of station frame elements removably secured to said anchorages supporting said workpiece over an extended area at spaced stations, and an arrangement of attachments associated with each of said station frame elements securing the workpiece to said workpiece support, wherein each of said anchorages allows the respective station frame element to be secured thereto in either of two different angular working orientations.

13. A workpiece support according to claim 12, wherein said attachments comprises at least one suction device.

14. A workpiece support according to claim 13, wherein said at least one suction device comprises a plurality of suction cups of resiliently deformable material.

15. A workpiece support according to claim 12, wherein at least one station frame element has a convex or concave outer profile and said attachments are disposed one at or adjacent the peak or trough of the profile and one or more on the flanks of the profile to either side thereof.

16. A workpiece support according to claim 12, wherein at least one of said station frame elements includes a location element for co-operation with a corresponding location element on said workpiece, to locate said workpiece relative to said workpiece support.

17. A workpiece support according to claim 16, wherein the two outermost station frame elements include location elements.

18. A workpiece support according to claim 16, wherein said location element comprises a pin or spigot.

19. A workpiece support according to claim 12, wherein each anchorage comprises a clamp for removably clamping said station frame element to said base means.

20. A workpiece support according to claim 19, wherein said clamp comprises a hydraulically-operated clamp.

21. A workpiece support according to claim 12, wherein said anchorages are spaced at generally regular intervals.

22. A machine tool including a workpiece support for supporting a workpiece of a given profile, and being reconfigurable to support a workpiece of a different profile, said workpiece support including:

a base having a plurality of anchorages at spaced intervals;

a plurality of station frame elements removably secured to said anchorages supporting said workpiece over an extended area at spaced stations, and attachments associated with each of said station frame elements securing the workpiece to said workpiece support, wherein each of said anchorages allows the respective station frame element to be secured thereto in either of two different angular working orientations.

23. A method of providing support for one of a number of workpieces of different profiles, which includes:

providing a base means having a plurality of anchorage means at spaced stations;

providing a plurality of frame elements corresponding to the profiles of said workpieces at said spaced stations;

selecting for a given workpiece the frame elements corresponding to the profiles at said stations;

removably securing said frame elements to said base means in either of two different angular working orientations to define a reconfigurable workpiece support, and removably securing said workpiece to said workpiece support.

24. A method according to claim 23, wherein at least two of said workpieces have profiles which form a generally symmetrical pair, and wherein the same frame elements are used for each of the pair, with the orientation of the frame elements being reversed for the other one of the pair.

* * * * *